United States Patent
Blanchet et al.

(10) Patent No.: US 9,803,288 B2
(45) Date of Patent: *Oct. 31, 2017

(54) ARRANGEMENT OF FLOW STRUCTURES FOR USE IN HIGH DIFFERENTIAL PRESSURE ELECTROCHEMICAL CELLS

(71) Applicant: Nuvera Fuel Cells, Inc., Billerica, MA (US)

(72) Inventors: Scott Blanchet, Chelmsford, MA (US); Benjamin Lunt, Tewksbury, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,730

(22) Filed: Aug. 19, 2015

(65) Prior Publication Data
US 2015/0354069 A1 Dec. 10, 2015

Related U.S. Application Data

(62) Division of application No. 13/947,256, filed on Jul. 22, 2013.
(Continued)

(51) Int. Cl.
*C25B 1/10* (2006.01)
*H01M 8/1004* (2016.01)
(Continued)

(52) U.S. Cl.
CPC .............. *C25B 1/10* (2013.01); *C25B 9/066* (2013.01); *C25B 9/08* (2013.01); *H01M 4/8631* (2013.01);
(Continued)

(58) Field of Classification Search
CPC .. C25B 1/12; C25B 1/10; C25B 9/063; C25B 9/08; C25B 9/066; H01M 8/0271;
(Continued)

(56) References Cited

U.S. PATENT DOCUMENTS

| 6,261,711 B1 * | 7/2001 | Matlock ............. H01M 8/0247 |
| | | 429/513 |
| 2001/0004050 A1 | 6/2001 | Byron, Jr. et al. |

(Continued)

FOREIGN PATENT DOCUMENTS

| EP | 0 583 215 A1 | 2/1994 |
| JP | H07-065847 | 3/1995 |

(Continued)

OTHER PUBLICATIONS

International Search Report in International Application No. PCT/US2013/051298 dated Nov. 11, 2013.
(Continued)

*Primary Examiner* — Nicholas P D'Aniello
*Assistant Examiner* — Philip A Stuckey
(74) *Attorney, Agent, or Firm* — Finnegan, Henderson, Farabow, Garrett & Dunner LLP.

(57) ABSTRACT

The present disclosure is directed towards flow structures in electrochemical cells for use in high differential pressure operations. The flow structure on the low pressure-side of the cell has a larger surface area than the flow structure on the high-pressure side of the cell at the flow structure—MEA interface. The boundary of the high pressure flow structure is entirely within the boundary of the low pressure flow structure. A seal around the high pressure flow structure is also contained within the boundary of the low pressure flow structure. In such an arrangement, high fluid pressures acting on the electrolyte membrane from the high-pressure side of the cell is fully and continuously balanced by the flow structure on the low pressure-side of the membrane. Use of the low pressure flow structure as a membrane support prevents the rupture or deformation of the membrane under high stresses.

6 Claims, 6 Drawing Sheets

Related U.S. Application Data

(60) Provisional application No. 61/674,976, filed on Jul. 24, 2012.

(51) Int. Cl.

| | | |
|---|---|---|
| *H01M 4/86* | (2006.01) | |
| *H01M 8/04082* | (2016.01) | |
| *C25B 9/08* | (2006.01) | |
| *C25B 9/06* | (2006.01) | |
| *H01M 8/0258* | (2016.01) | |
| *H01M 8/2465* | (2016.01) | |
| *H01M 8/0232* | (2016.01) | |
| *H01M 8/0245* | (2016.01) | |
| *H01M 8/0271* | (2016.01) | |
| *H01M 8/04089* | (2016.01) | |
| *H01M 8/1018* | (2016.01) | |

(52) U.S. Cl.
CPC ....... *H01M 8/0232* (2013.01); *H01M 8/0245* (2013.01); *H01M 8/0258* (2013.01); *H01M 8/0271* (2013.01); *H01M 8/04201* (2013.01); *H01M 8/1004* (2013.01); *H01M 8/2465* (2013.01); *H01M 8/04104* (2013.01); *H01M 2008/1095* (2013.01); *Y02E 60/366* (2013.01)

(58) Field of Classification Search
CPC ........... H01M 8/04201; H01M 8/1004; H01M 4/8631; H01M 8/0278; H01M 8/2465; H01M 8/0232; H01M 8/0245; Y02E 60/366

See application file for complete search history.

(56) References Cited

U.S. PATENT DOCUMENTS

| | | | |
|---|---|---|---|
| 2003/0049518 A1* | 3/2003 | Nanaumi | H01M 4/926 429/480 |
| 2005/0014056 A1 | 1/2005 | Zuber et al. | |
| 2006/0251947 A1 | 11/2006 | Carter et al. | |
| 2007/0077475 A1* | 4/2007 | Lai | H01M 4/8605 429/483 |
| 2009/0181278 A1 | 7/2009 | Son et al. | |
| 2009/0286121 A1* | 11/2009 | Morimoto | H01M 8/0273 429/494 |
| 2010/0040926 A1 | 2/2010 | Blanchet et al. | |
| 2012/0064430 A1* | 3/2012 | Nakanishi | H01M 8/1004 429/480 |
| 2012/0094215 A1 | 4/2012 | Satou et al. | |

FOREIGN PATENT DOCUMENTS

| | | |
|---|---|---|
| JP | H10-265989 A | 10/1998 |
| JP | 2003-068323 A | 3/2003 |
| JP | 2007-533088 A | 11/2007 |
| JP | 2009-513820 A | 4/2009 |
| JP | 2009-514144 A | 4/2009 |
| JP | 2010-186717 A | 8/2010 |
| JP | 2010-244689 A | 10/2010 |
| JP | 2012-508320 A | 4/2012 |
| JP | 2012-117140 A | 6/2012 |
| WO | WO 2010/092175 A1 | 8/2010 |

OTHER PUBLICATIONS

Notification of Reasons for Rejection issued in Japanese Patent Application No. 2015-524340, dated Jun. 6, 2017, 7 pages.
Provision of Information filed Jul. 4, 2017, with the Japanese Patent Office in Japanese Application 2015-524340.

* cited by examiner

ARRANGEMENT OF FLOW STRUCTURES FOR USE IN HIGH DIFFERENTIAL PRESSURE ELECTROCHEMICAL CELLS

This is a divisional application of U.S. patent application Ser. No. 13/947,256, filed Jul. 22, 2013, pending, which claims the benefit of U.S. Provisional Patent Application No. 61/674,976, filed Jul. 24, 2012, both of which are incorporated herein by reference.

The present disclosure is directed towards electrochemical cells, and more specifically, the design and arrangement of flow structures for use in high differential pressure electrochemical cells.

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrons flow through the circuit to the cathode and generates electricity, while the protons diffuse through the electrolyte membrane to the cathode. At the cathode, hydrogen protons combine with electrons and oxygen (supplied to the cathode) to produce water and heat.

An electrolysis cell represents a fuel cell operated in reverse. A basic electrolysis cell functions as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion. Electrochemical hydrogen manipulation has emerged as a viable alternative to the mechanical systems traditionally used for hydrogen management. Successful commercialization of hydrogen as an energy earner and the long-term sustainability of a "hydrogen economy" depends largely on the efficiency and cost-effectiveness of fuel cells, electrolysis cells, and other hydrogen manipulation/management systems.

In operation, a single fuel cell can generally generate about 1 volt. To obtain the desired amount of electrical power, individual fuel cells are combined to form a fuel cell stack. The fuel cells are stacked together sequentially, each cell including a cathode, a electrolyte membrane, and an anode. Each cathode/membrane/anode assembly constitutes a "membrane electrode assembly", or "MEA", which is typically supported on both sides by bipolar plates. Gases (hydrogen and air) are supplied to the electrodes of the MEA through channels formed in the plates, which are known as flow fields. In addition to providing mechanical support, the bipolar plates (also known as flow field plates) physically separate individual cells in a stack while electrically connecting them.

FIG. 1 is an exploded schematic view showing the various components of a prior art PEM fuel cell 10. As illustrated, bipolar plates 2 flank the "membrane electrode assembly," which comprises an anode 7A, a cathode 7C, and an electrolyte membrane 8. Hydrogen atoms supplied to anode 7A are electrochemically split into electrons and protons (hydrogen ions). The electrons flow through an electric circuit to cathode 7C and generate electricity in the process, while the protons move through electrolyte membrane 8 to cathode 7C. At the cathode, protons combine with electrons and oxygen (supplied to the cathode) to produce water and heat.

Additionally, prior art PEM fuel cell 10 comprises electrically-conductive gas diffusion layers (GDLs) 5 within the cell on each side of the MEA. Gas diffusion layers 5 serve as diffusion media enabling the transport of gases and liquids within the cell, provide electrical conduction between bipolar plates 2 and electrolyte membrane 8, aid in the removal of heat and process water from the cell, and in some cases, provide mechanical support to electrolyte membrane 8. Gas diffusion layers 5 can comprise a woven or non-woven carbon cloth with electrodes 7A and 7C coated on the sides facing the electrolyte membrane. In some cases, the electrodes 7A and 7C include an electrocatalyst material coated onto either the adjacent GDL 5 or the electrolyte membrane 8. Generally, carbon-fiber based gas diffusion layers do not meet the performance requirements of a high-differential pressure cell, particularly because of limited structural properties of these materials. Therefore, some high-pressure electrochemical cells use "frit"-type densely sintered metals, screen packs, or expanded metals in combination with or as a replacement for traditional GDLs to provide structural support to the MEA in combination with traditional, land-channel flow fields 4 formed in the bipolar plates 2. Layered structures (i.e., screen packs and expanded metals) provide relatively thick structures suitable for high differential pressure operations. However, they introduce other performance penalties, for example, high contact resistance, high flow resistance, large cell pitch, etc. To overcome the physical limitations of these layered structures, three-dimensional porous metallic substrates can be used as a replacement for traditional land-channel flow fields 4 and GDLs 5 in high differential pressure electrochemical cells. In an electrochemical cell using porous metallic flow fields, reactant gases on each side of the electrolyte membrane flow through the three-dimensional porous flow fields and diffuse through the porous GDL to reach the electrolyte membrane.

High-differential pressure cells face the additional challenge of maintaining the integrity of electrolyte membrane 8 during operation. The membrane is inherently weaker than other components in the cell assembly, and therefore, additional mechanical support and/or other design considerations are required to prevent deformation or failure of the membrane during high differential pressure operations. Membrane reinforcement can limit the movement or flexing of the membrane under high pressures; however, reinforcement structures can interfere with fluid interchange through the membrane and increase the overall size/weight of the cell. Thus, there is a continuing challenge to improve the design of electrochemical cells to enable the electrolyte membrane to withstand the forces associated with the high pressure differentials, but without adding further components to the cell and allowing adequate fluid exchange through the membrane.

The present disclosure is directed towards the design and arrangement of flow fields and GDLs for supporting the electrolyte membrane during high-differential pressure operations. In particular, the present disclosure is directed towards the arrangement of three-dimensional, porous metallic flow fields and GDLs for use with high differential pressure electrochemical cells, including, but not limited to, fuel cells, electrolysis cells, hydrogen purifiers, hydrogen expanders, and hydrogen compressors. In an illustrative embodiment of the present disclosure, porous metallic flow fields can perform the functions typically required of GDLs, thereby introducing the possibility of eliminating the GDLs from the electrochemical cell assembly. In an alternative embodiment, a porous metallic substrate consisting of two distinct layers having different average pore sizes (for example, larger pores constituting the flow field and smaller pores replacing the GDL) can be placed in contact with the electrolyte membrane. Accordingly, the flow field and the GDL are collectively referred to as "flow structure" hereinafter, unless specified otherwise. It is within the scope of the present disclosure to use porous metallic flow fields for use with conventional GDLs, or to fabricate porous metallic GDLs for use in combination with conventional channel-type flow fields.

A first embodiment of the present disclosure is an electrochemical cell for use in high differential pressure operations, the electrochemical cell comprising a first electrode, a second electrode, and an electrolyte membrane disposed therebetween. The cell includes a first flow structure adjacent to the first electrode, the first flow structure comprising a first planar surface along a side facing the electrolyte membrane. The cell further includes a second flow structure adjacent to the second electrode, the second flow structure comprising a second planar surface along a side facing the electrolyte membrane. The second flow structure in the electrochemical cell is configured to withstand higher structural forces than the first flow structure. Further, the area of the first planar surface is smaller than the area of the second planar surface in the electrochemical cell.

Another embodiment of the present disclosure is an electrochemical cell comprising a first electrode, a second electrode, and an electrolyte membrane disposed therebetween. The cell comprises a first and a second bipolar plates on opposite sides of the electrolyte membrane. The cell further includes a first flow structure between the first electrode and the first bipolar plate, the first flow structure comprising a first surface along a side facing the electrolyte membrane, and a second flow structure between the second electrode and the second bipolar plate, the second flow structure comprising a second surface along a side facing the electrolyte membrane. The second flow structure in the electrochemical cell is configured to withstand higher structural forces than the first flow structure. Additionally, the perimeter of the first surface is smaller than the perimeter of the second surface and the perimeter of the first surface is entirely within the perimeter of the second surface.

The accompanying drawings, which are incorporated in and constitute a part of this specification, illustrate embodiments of the invention and together with the description, serve to explain the principles of the various aspects of the invention.

It is to be understood that both the foregoing general description and the following detailed description are exemplary and explanatory only and are not restrictive of the invention, as claimed.

Reference will now be made to certain embodiments consistent with the present disclosure, examples of which are illustrated in the accompanying drawings. Wherever possible, the same reference numbers are used throughout the drawings to refer to the same or like parts. It is to be understood that the although the present disclosure is described in relation to a high differential pressure electrochemical cell, the devices and methods of the present disclosure can be employed with various types of electrochemical cells, including, but not limited to, electrochemical cells operating under high differential pressures.

The present disclosure is directed towards the arrangement of three-dimensional porous flow structures inside electrochemical cells for use in high differential pressure operations. In illustrative embodiments, one of the flow structures in the electrochemical cell is exposed to higher fluid pressures during operation than the flow structure on the other side of the electrolyte membrane. For instance, when an electrochemical cell is configured as a hydrogen compressor, the flow structure on the cathode side of the membrane is exposed to higher pressures than the flow structure on the anode side. Hereinafter, the flow structure that is exposed to higher fluid pressures during operation is referred to as the "high pressure flow structure" and the flow structure that is subjected to comparatively lower fluid pressures is referred to as the "low pressure flow structure." In exemplary embodiments, the low pressure flow structure has a larger surface area than the high pressure flow structure along the sides parallel to the membrane. In such an arrangement, the high fluid pressures acting on the electrolyte membrane is fully and continuously balanced by structural support from the three-dimensional porous substrate (i.e., the flow structure) on the low pressure-side of the membrane. Use of the low pressure flow structure as a membrane support obviates the need for additional membrane reinforcement structures to support the membrane against high stresses. The continuous support provided to the membrane by the low pressure flow structure enables the use of traditional, thin electrolyte membranes (e.g., PFSA (perflurosulfonic acid) membranes having a thickness <30 μm) in high differential pressure operations without resulting in membrane deformation or failure.

Figure 1:
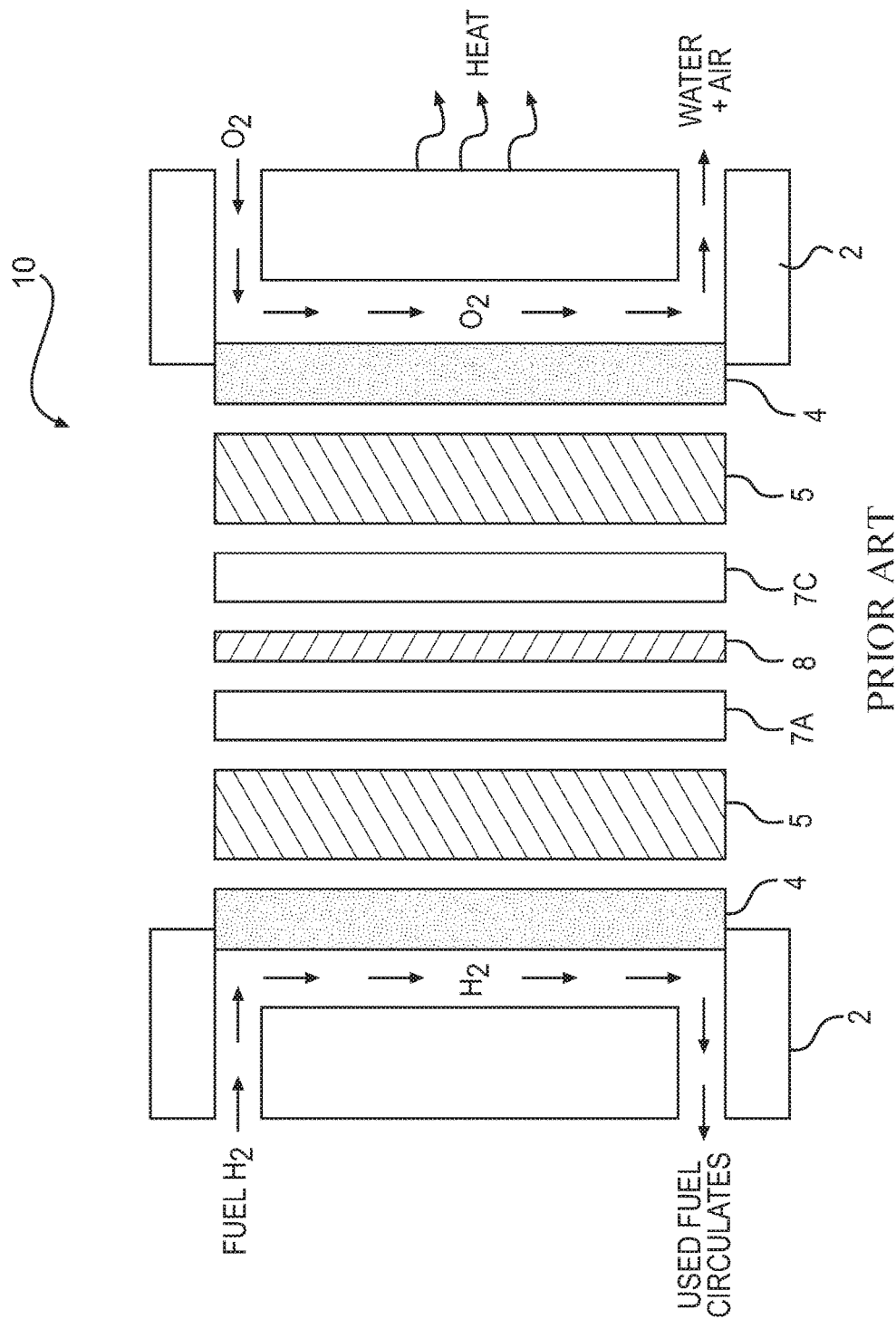
FIG. 1 illustrates an exploded schematic view showing the various components of a prior art Proton Exchange Membrane (PEM) fuel cell.
Figure 2:
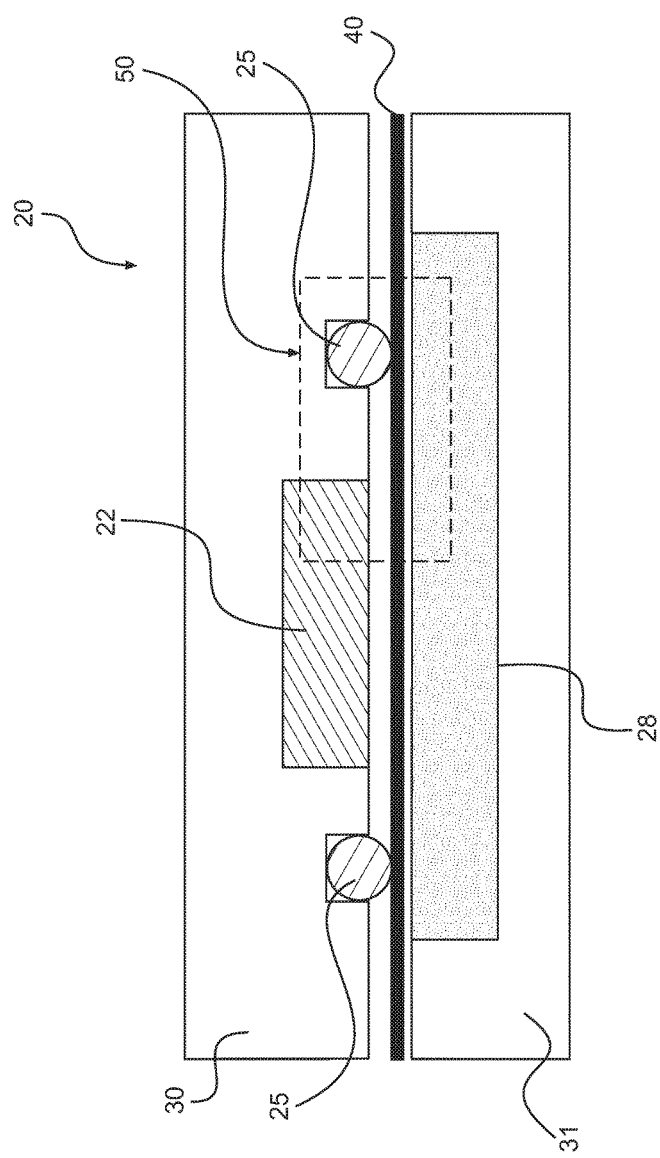
FIG. 2 illustrates a cross-sectional view of an electrochemical cell for use in high differential pressure operations, in accordance with exemplary embodiments of the present disclosure.

FIG. 2 shows a cross-sectional view of an electrochemical cell 20 for use in high differential pressure operations. As illustrated in FIG. 2, cell 20 comprises an electrolyte membrane 40 which is flanked by a high pressure flow structure 22 on one side and a low pressure flow structure 28 on the other side. High pressure flow structure 22 and low pressure flow structure 28 are surrounded by bipolar plates 30 and 31, respectively, which separate electrochemical cell 20 from the neighboring cells in the stack. Bipolar plate 30 is situated on the high pressure-side of cell 20 and bipolar plate 31 is situated on the low pressure-side of the cell. A seal 25 is provided between bipolar plate 30 and membrane 40 to prevent leakage of high pressure gas. Seal 25, also referred to herein as the high pressure-side seal, pinches the membrane against low pressure flow structure 28. In exemplary embodiments, seal 25 comprises an elastomeric or polymeric sealing material, for example, silicone, EPDM (ethylenepropylene-diene-monomer), fluoroelastomer, nitrile rubber (Buna-N), PTFE (polytetrafluoroethylene), polysulfone, polyetherimide, polychenylene sulfide, PEEK (polyether ether ketone), polyimide, PET (polyethylene terephthalate), PEN (polyethylene naphthalate), HDPE (high-density polyethylene), polyurethane, neoprene, acetal, nylon, polybutylene terephthalate, NBR (acrylonitrile-butadiene rubber), etc.

As illustrated in FIG. 2, high pressure flow structure 22 has a smaller surface area than lour pressure flow structure 28 at the flan structure-MEA interface, i.e., on the sides facing electrolyte membrane 40. In exemplary embodiments, the boundary of high pressure field 22 at the flow structure-MEA interface is completely encompassed by the boundary of low pressure flow structure 28. In such an arrangement where low pressure flow structure 28 has a larger surface area than high pressure flow structure 22, the high fluid pressure acting on electrolyte membrane 40 from the high pressure flow structure is continuously balanced by the structural support provided by the low pressure flow structure located on the other side of the membrane. Such an arrangement ensures that every part of the membrane 40 that is exposed to high fluid pressure is supported by the low pressure flow structure 28. The uniform and continuous support provided by the low pressure flow structure 28 protects against high stress points on membrane 40 which are known to cause membrane failure. The reinforcement provided by low pressure flow structure 28 further ensures that membrane 40 does not flex excessively under the high pressure, thereby preventing rupture. In an exemplary electrochemical cell used for hydrogen compression, the cell was able to operate at differential pressures higher than about 12,000 psi without rupturing the membrane, with differential pressure being measured as the difference between the inlet hydrogen pressure (which can range from about −10 psi to about 0 psi, or from about 0 psi to about 25 psi, about 100 psi, about 500 psi, about 1000 psi, or about 6000 psi) and the compressed hydrogen pressure (which can range from the lower bound of the inlet hydrogen pressure to higher than about 12,000 psi).

Figure 3A:
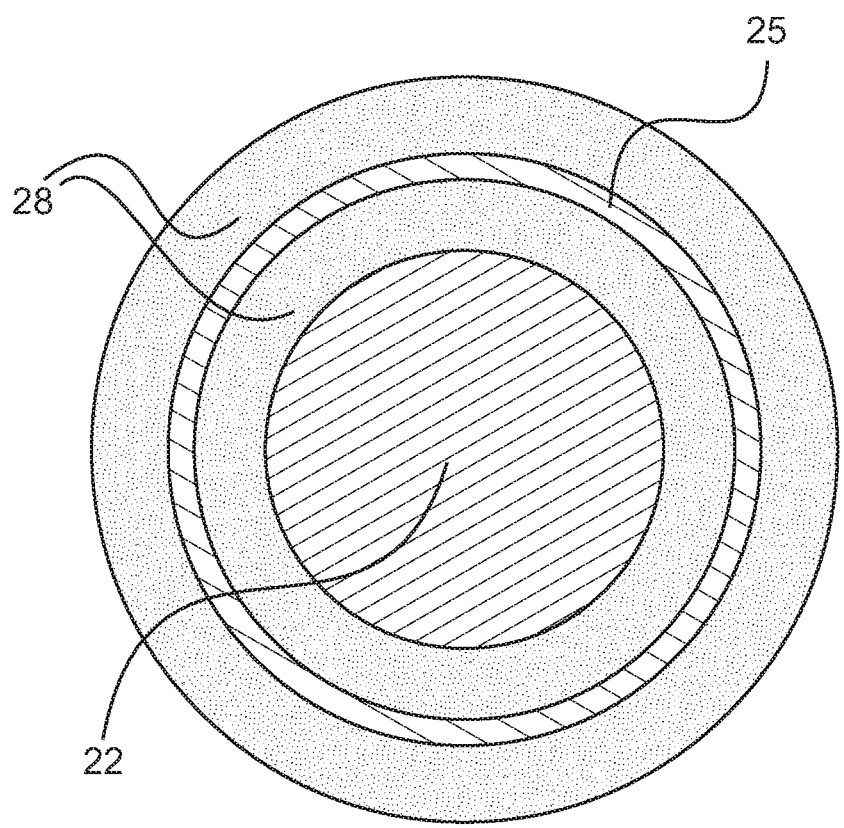
FIGS. 3A-3C illustrate plan views of the high pressure and low pressure flow structures for various electrochemical cell geometries, in accordance with exemplary embodiments of the present disclosure.
Figure 3B:
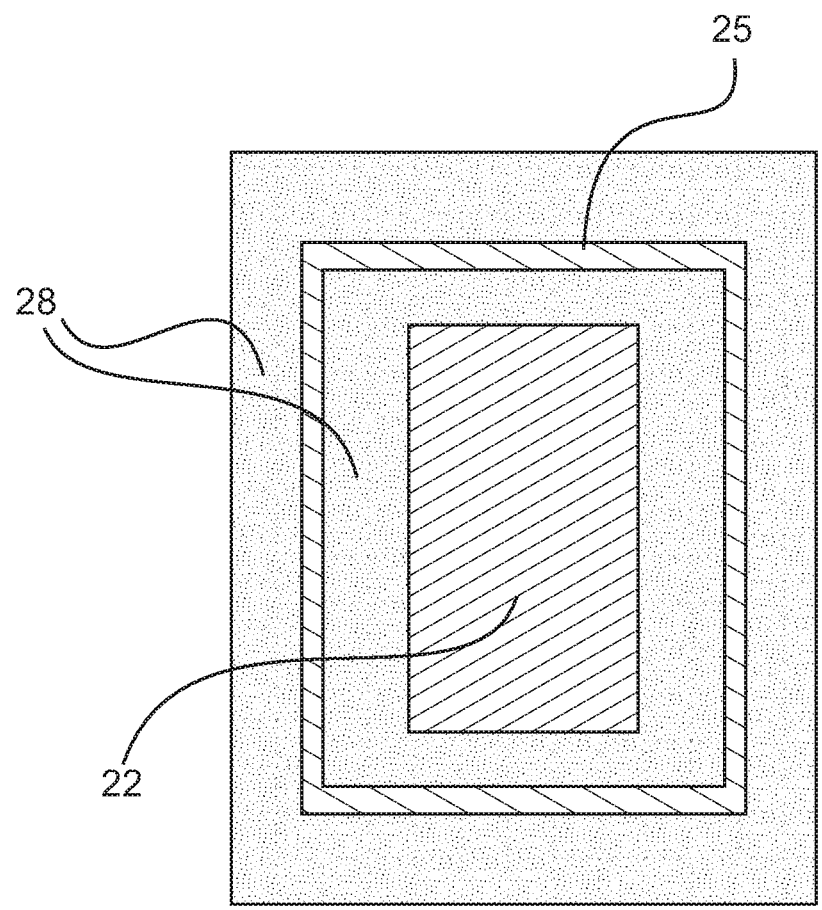
Figure 3C:
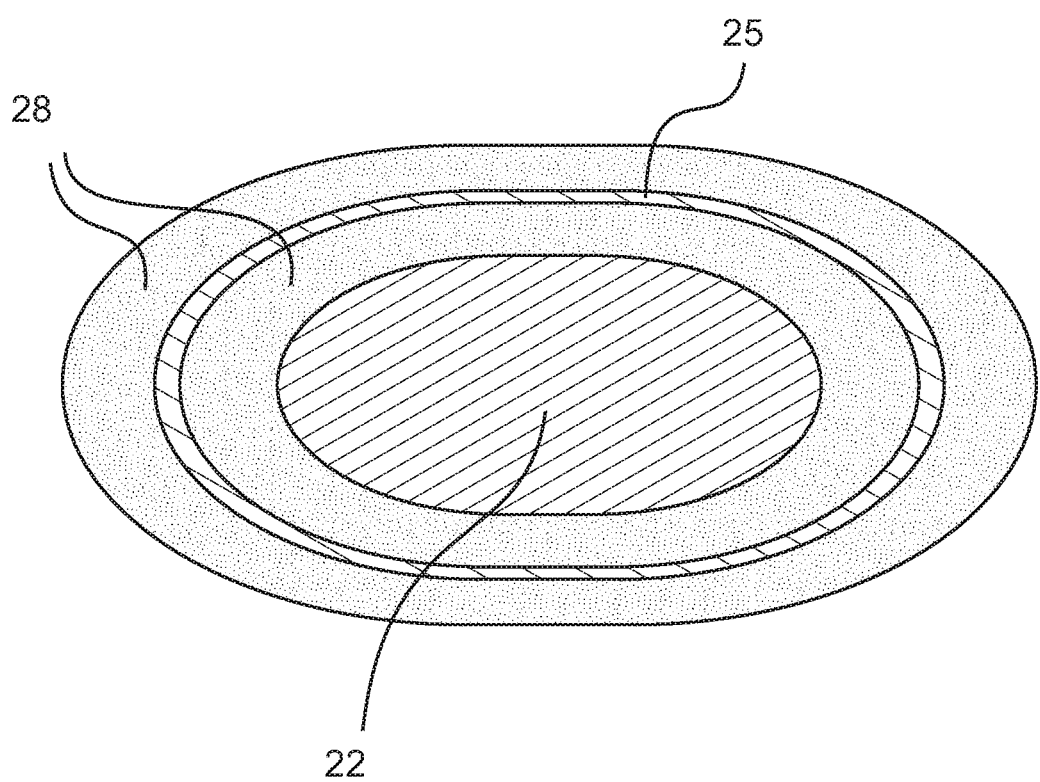

FIGS. 3A-3C show plan views of the high pressure flow structure 22 and low pressure flow structure 28 for various possible electrochemical cell geometries. FIG. 3A illustrates an arrangement where the flow structures of the electrochemical cell are circular framed; FIG. 3B illustrates an arrangement where the flow structures are rectangular framed; and FIG. 3C illustrates an arrangement where the flow structures are oval framed. Various other flow structure geometries are possible depending upon the design of the electrochemical cell. As illustrated in FIGS. 3A-3C, the perimeter of the high pressure flow structure on the side facing membrane 40 is contained entirely within the perimeter of the low pressure flow structure on the side facing the membrane. FIGS. 3A-3C further demonstrate that seal 25 is contained within the perimeter of the low pressure field on the side facing the membrane, such that the high pressure-side sealing is accomplished against the contiguous low pressure flow structure. In a design where the low pressure flow structure is equal to or smaller than the high pressure field, any potential gap between the bipolar plate and the low pressure flow structure (e.g., at the extremities of the low pressure flow structure) can create a failure point for the membrane-electrode-assembly. By encompassing the high pressure-side seal within the boundary of the low pressure flow structure, any gaps between bipolar plate 31 and low pressure field 28 are not exposed to high pressure field 22. Such an arrangement further ensures that discontinuities in the low pressure side (e.g., any portion of the membrane that is not supported by the low pressure flow structure) are not exposed to high pressures. In exemplary embodiments, all of the high pressure-side seals in the entire cell stack are within the perimeters of the respective low pressure flow structures.

In an illustrative embodiment, flow structures 22, 28 are fabricated using metal foams or other porous metallic substrates. In one such embodiment, an open, cellular flow structure is formed by compacting a highly porous metallic material, such as, a metal foam, sintered metal frit, or any other porous metal. The porous metallic material can comprise a metal, such as, stainless steel, titanium, aluminum, nickel, iron, etc., or a metal alloy, such as, nickel chrome alloy, nickel-tin alloy, etc. In some illustrative embodiments, the size of the pores in the metallic material can range from about 10 to about 1000 µm. For example, the pore size of the metallic material can range from about 20 µm to about 1000 µm, such as from about 50 µm to about 1000 µm, from about 20 µm to about 900 µm, etc, from about 30 µm to about 800 µm, from about 40 µm to about 700 µm, from about 50 µm to about 600 µm, from about 60 µm to about 500 µm, from about 70 µm to about 500 µm, from about 100 µm to about 450 µm, from about 200 µm to about 450 µm, and from about 350 µm to about 450 µm. In certain embodiments, the average pore size of the metallic material is about 400 µm, about 500 µm, or about 800 µm. In some embodiments, the void volume of the metallic material can be greater than about 75%, greater than about 80%, greater than about 85%, greater than about 90%, greater than about 95%, about 75%, about 80%, about 85%, about 90%, or about 95%. The compaction process increases the overall strength of the porous metallic material. For instance, in one embodiment, the yield strength of the porous metallic material before compaction is 30 psi and after compaction the strength increases to 14,000 psi.

In certain embodiments, low pressure flow structure 28 is compacted to a density level greater than that of high pressure flow structure 22. In some embodiments, a porous metallic material intended to form low pressure flow structure 28 is compacted to an exposed axial stress level ("$P_{exposed}$") equal to or greater than the intended operational pressure ("$P_{operation}$") of the electrochemical cell. In some embodiments, the ratio of the exposure stress and the operational pressure ($P_{exposed}/P_{operation}$) ranges from a value of about 1 to about 1.5. For example, if an electrochemical cell is intended to be operated at a differential pressure of about 4,000 psi, then a porous metallic material forming low pressure flow structure 28 is compacted to a stress level equal to or greater than about 4,000 psi.

In some embodiments, the compacted porous metallic matrix is laminated on one side with a micro-porous material layer (MPL) to form the flow structure. For example, the porous metallic matrix can be laminated with the MPL before the compaction process, or the porous metallic matrix can be laminated with the MPL after the compaction process. Lamination can include calendering, pressing, or coating the MPL onto the porous material. The flat, smooth laminated surface can be placed adjacent to the electrolyte membrane of an electrochemical cell. In illustrative embodiments, the average pore size of the laminated MPL is less than the average pore size of the compacted layer, which can create a porosity gradient through the metallic flow structure and facilitate the distribution of mechanical support to the electrolyte membrane. In exemplary embodiments, the MPLs have average pore size ranging from about 0.5 µm to 10 µm.

In additional embodiments, the MPL is coated with an electrocatalyst layer if the electrocatalyst is not integral to the membrane electrode assembly. The resulting laminated structure can be arranged in the electrochemical cell with the electrocatalyst layer positioned adjacent to the membrane. In some embodiment where MPL is not used, the electrocatalyst layer can be coated directly onto the compacted porous metallic matrix substrate on the side facing the electrolyte membrane.

Figure 4:
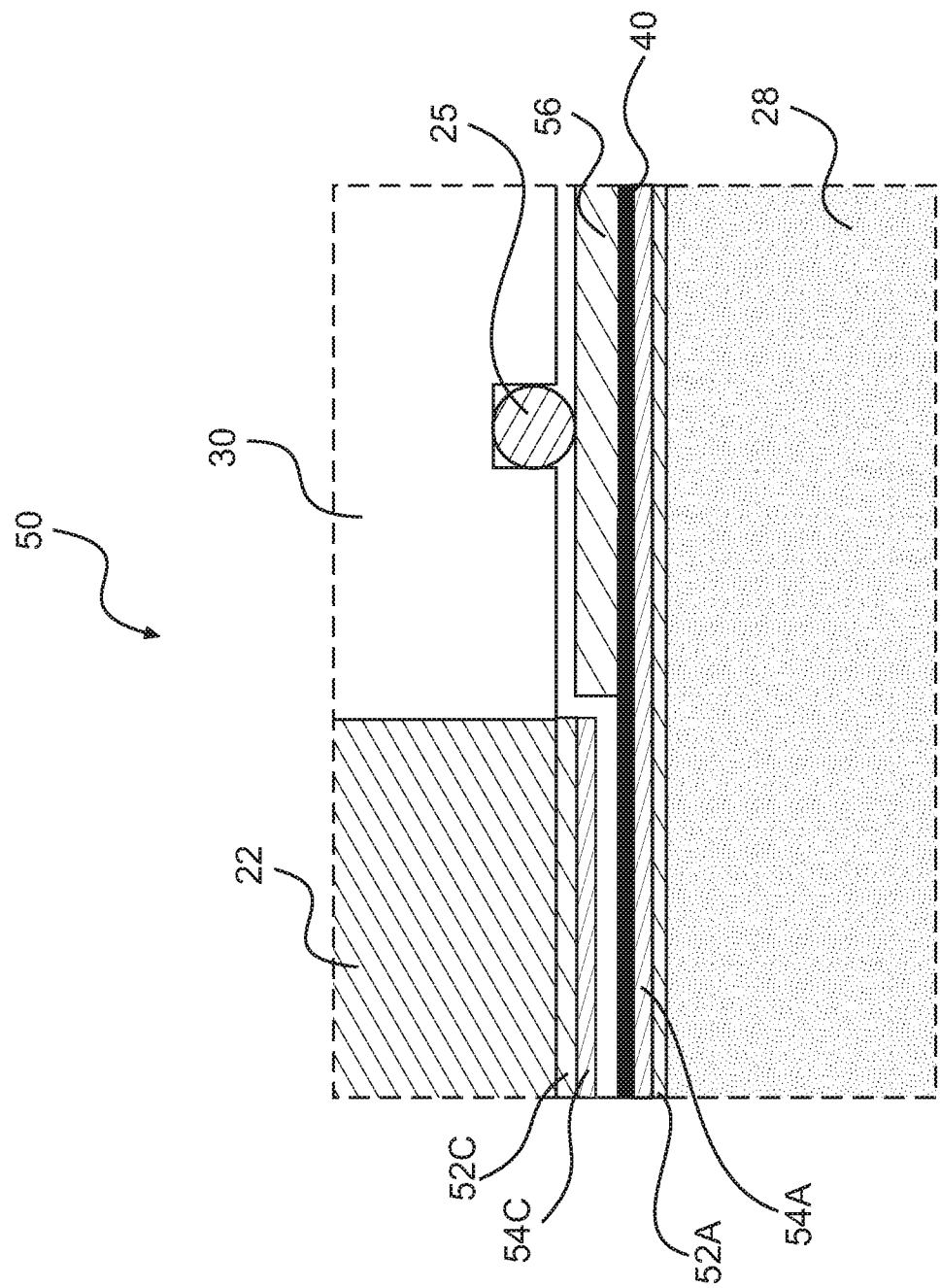
FIG. 4 illustrates an expanded view of a portion of the electrochemical cell depicted in FIG. 2, in accordance with exemplary embodiments of the present disclosure.

FIG. 4 shows an expanded view of area 50 in FIG. 2 to further illustrate the various components of an exemplary embodiment of electrochemical cell 20 at the flow structure-MEA interface. As illustrated in FIG. 4, high pressure flow structure 22 and low pressure flow structure 28 are laminated with MPLs 52A and 52C, respectively, on the sides facing electrolyte membrane 40. In exemplary embodiments, electrodes 54A and 54C are placed adjacent to, bonded, laminated, directly cast, or coated onto the flow structures 22 and 28, respectively. In some embodiments, electrochemical cell 20 comprises a reinforcement border 56 around the periphery of high pressure field 22 between bipolar plate 30 and electrolyte membrane 40. In certain embodiments, reinforcement border 56 is located along the area between the boundaries of the high pressure and the low pressure flow structures. In such embodiments, seal 25 is positioned between reinforcement layer 56 and bipolar plate 30, as illustrated in FIG. 4, because seal 25 is located in the area between the boundaries of the high pressure and low pressure flow structures 22. In exemplary embodiments, reinforcement layer 56 comprises a polymeric material, for example, silicone, EPDM (ethylenepropylene-diene-monomer), fluoroelastomer, nitrile rubber (Buna-N), PTFE (polytetrafluoroethylene), polysulfone, polyetherimide, polychenylene sulfide, PEEK (polyether ether ketone), polyimide, PET (polyethylene terephthalate), PEN (polyethylene naphthalate), HDPE (high-density polyethylene), polyurethane, neoprene, acetal, nylon, polybutylene terephthalate, NBR (acrylonitrile-butadiene rubber), etc. In some embodiments, reinforcement border 56 is bonded to electrolyte membrane 40 to create a integrated "flow structure-electrode-membrane-border" assembly to reduce the number of processing steps during the cell manufacturing and assembly stage.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrochemical cell comprising:
   a first electrode, a second electrode, and an electrolyte membrane disposed therebetween;
   a first bipolar plate and a second bipolar plate on opposite sides of the electrolyte membrane;
   a first flow structure between the first bipolar plate and the first electrode, the first flow structure comprising a first surface along a side facing the first electrode;
   a second flow structure between the second bipolar plate and the second electrode, the second flow structure comprising a second surface along a side facing the second electrode;
   a seal located between the second bipolar plate and the electrolyte membrane; and
   wherein the seal is located within a recess of the second bipolar plate;
   a reinforcement layer adjacent the second bipolar plate and the electrolyte membrane in an area between a perimeter of the first flow structure and a perimeter of the second flow structure;
   wherein a perimeter of the first surface is larger than a perimeter of the second surface;
   wherein the perimeter of the second surface is entirely within the perimeter of the first surface; and
   wherein the seal is positioned entirely within an area between the perimeter of the first surface and the perimeter of the second surface.

2. The electrochemical cell of claim 1, wherein the seal is located between the second bipolar plate and the reinforcement layer.

3. The electrochemical cell of claim 1, wherein the reinforcement layer is bonded to the electrolyte membrane.

4. The electrochemical cell of claim 1, wherein the first and the second flow structures comprise porous metallic substrates.

5. The electrochemical cell of claim 4, wherein the first flow structure is compacted to a density level greater than that of the second flow structure.

6. The electrochemical cell of claim 4, wherein at least one of the first and the second flow structures is laminated with a micro-porous material layer.

* * * * *